2,255,176

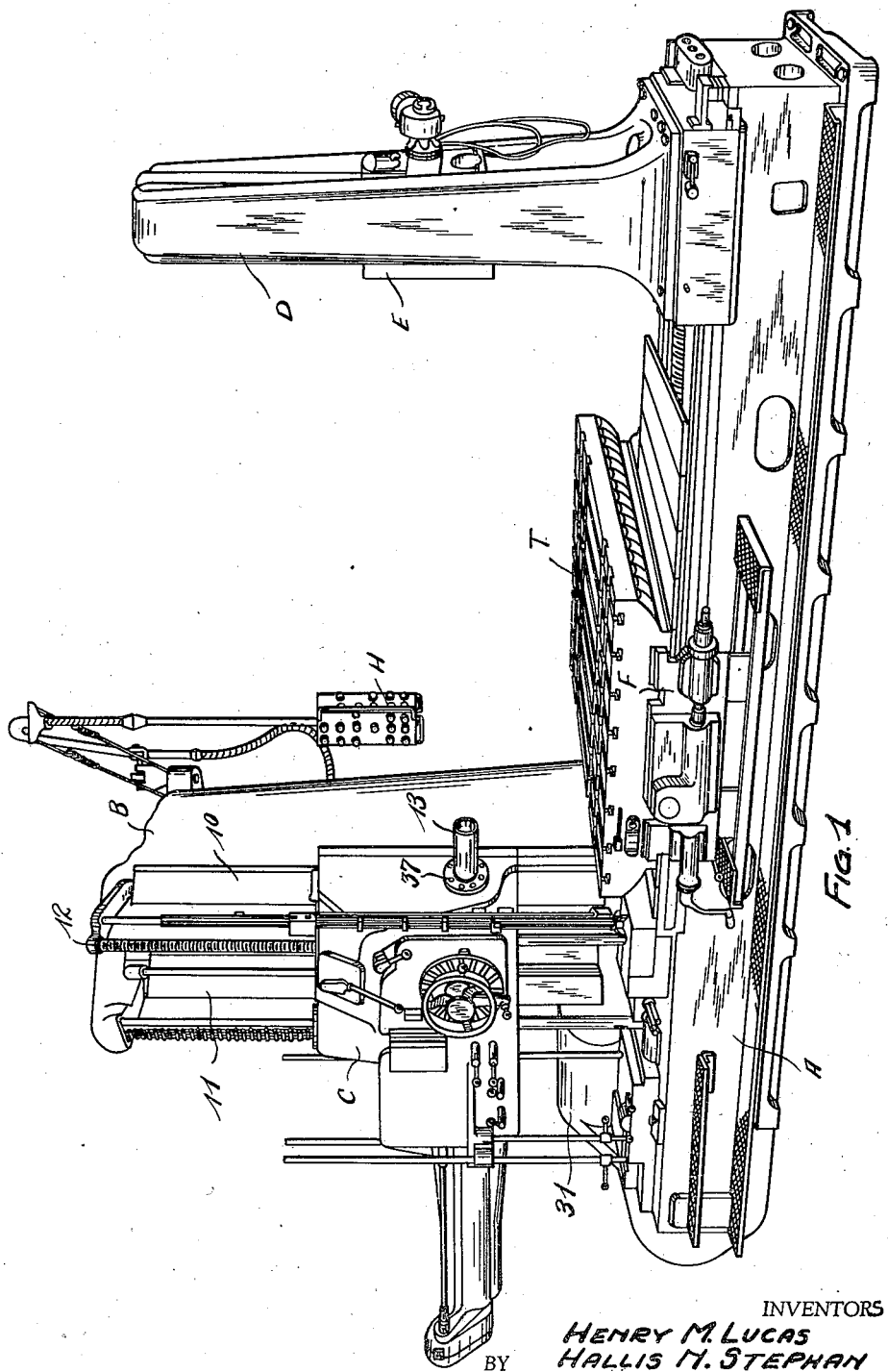

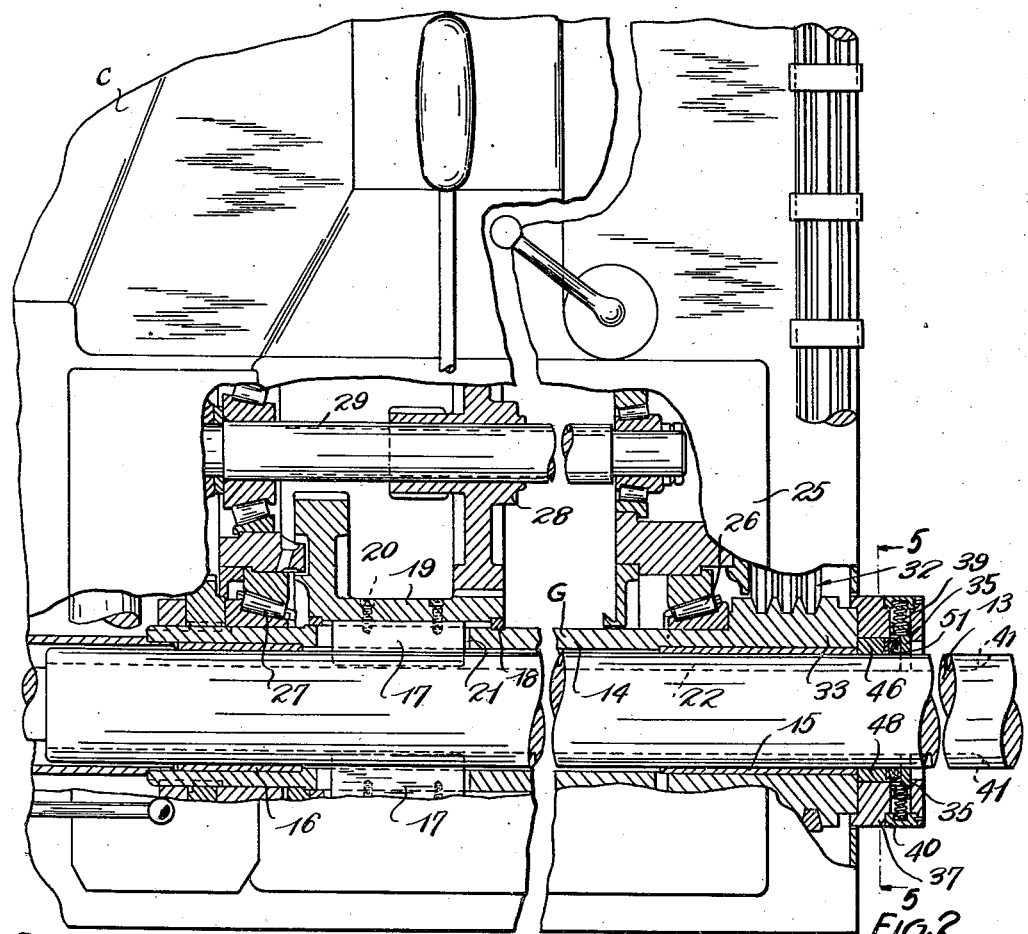
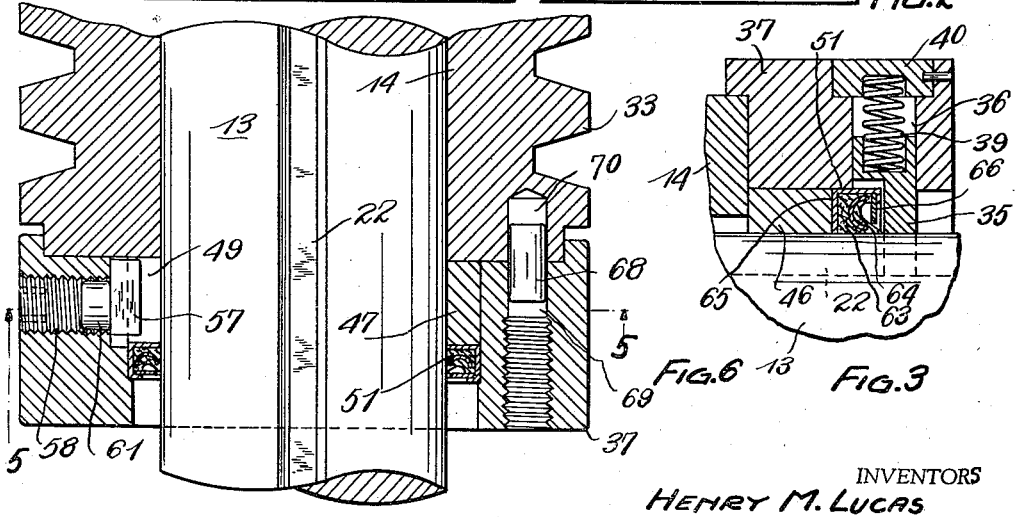
INVENTORS
HENRY M. LUCAS
HALLIS N. STEPHAN
BY Kwis Hudson & Kent
ATTORNEYS Patented Sept. 9, 1941

UNITED STATES PATENT OFFICE 2,255,176

HORIZONTAL BORING MACHINE

Henry M. Lucas and Hallis N. Stephan, Cleveland Heights, Ohio, assignors, by mesne assignments, to The Lucas Machine Tool Company, Bratenahl, Ohio, a corporation of Ohio Application December 7, 1939, Serial No. 308,022

15 Claims. (Cl. 77—3)

The present invention relates to metal working machines and more particularly to a means for supporting and clamping a slidable member within an aperture, such as the spindle of a horizontal boring machine within the spindle quill thereof.

An object of the present invention is the provision of novel means for clamping a cylindrical member within an aperture without relative movement between the axis thereof.

Another object of the present invention is the provision of novel means for clamping a spindle slidably supported within a tubular member or quill, such as the spindle of a horizontal boring machine within the quill thereof without causing the spindle to run out.

Another object of the present invention is the provision of novel means for clamping a slidable spindle within a tubular member or quill, which means comprises a plurality of members adapted to engage the spindle at equally spaced points, the construction being such that as the clamping means is applied, the axis of the spindle will not be moved relative to the axis of the quill.

Another object of the present invention is the provision of a novel horizontal boring machine comprising means for clamping the tool spindle within the quill without causing the spindle to run out.

Another object of the present invention is the provision of novel and improved means for preventing chips, etc., from entering a housing along a keyway of a spindle projecting therefrom.

Another object of the present invention is the provision of a novel horizontal boring machine comprising means for preventing chips, etc., from entering the spindle head along one or more of the keyways in the tool spindle.

The present invention resides in certain details of construction and combinations and arrangements of parts and further objects and advantages thereof will be apparent to those skilled in the art to which the invention relates from the following description of the preferred embodiment thereof described with reference to the accompanying drawings forming a part of this specification, in which similar reference characters designate corresponding parts, and in which:

Fig. 1 is a perspective view of a horizontal boring machine embodying the present invention;

Fig. 2 is a front elevational view of a portion of the spindle head shown in Fig. 1, with portions in section, on the center line of the spindle;

Fig. 3 is an enlarged view of a portion of Fig. 2;

Fig. 6 is a sectional view on the line 6—6 of Fig. 4.

Figure 4:
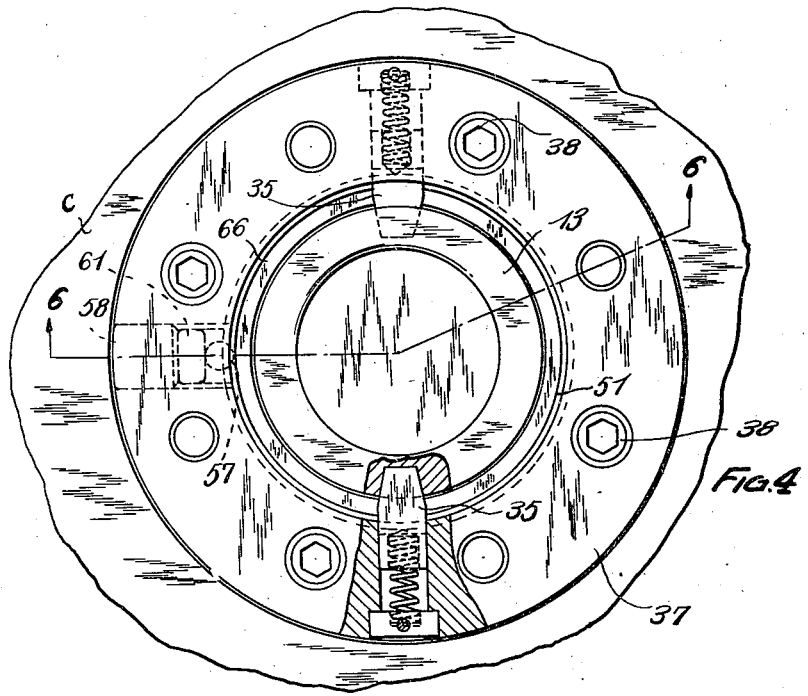
Fig. 4 is an elevational view of a portion of the spindle head shown in Figs. 1 and 2 looking into the end of the spindle, with portions broken away.
Figure 5:
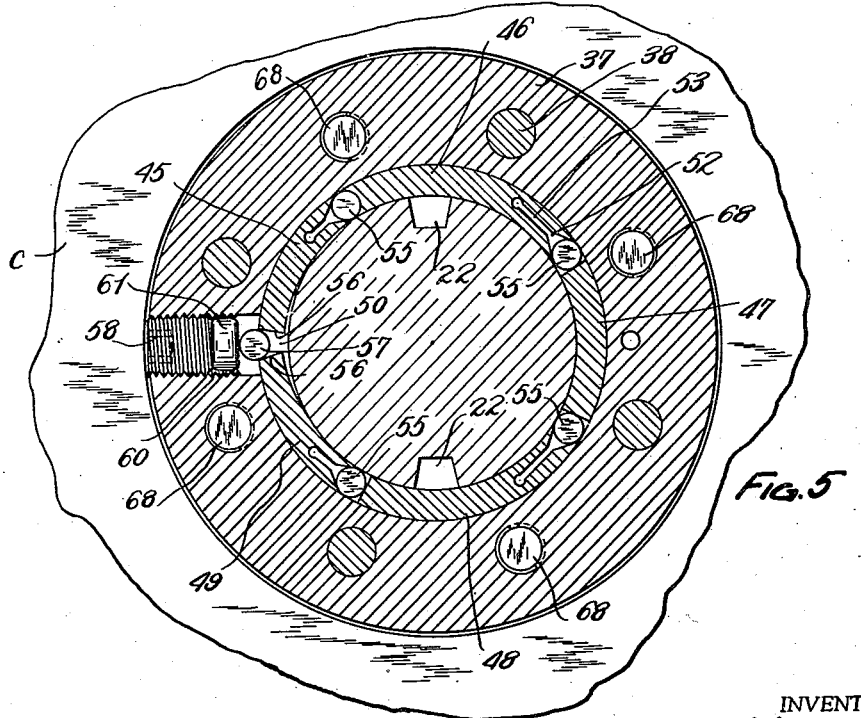
Fig. 5 is a sectional view on the line 5—5 of Figs. 2 and 6.

Referring to the drawings, the machine shown therein comprises a base A having at one end a spindle head column B comprising vertical ways 10 and 11 on its front face and upon which ways a spindle head C is mounted for vertical movement. The other end of the base or bed A is provided with an outboard support D including a backrest block E slidably supported thereby for vertical movement corresponding to the movement of the spindle head C. The spindle head C is moved vertically along the ways 10 and 11 upon rotation of a leadscrew 12 rotatably supported in the base A and the spindle head column B, which leadscrew has threaded engagement with a nut fixed within the spindle head. The machine also includes a saddle F slidably supported for longitudinal movement along the bed A and a table T slidably supported on the saddle F for movement transversely of the bed.

The tool spindle 13 is slidably supported within a spindle quill G comprising a tubular member 14 by bronze bushings 15 and 16 and is adapted to be rotated by or with the spindle quill through the medium of keys 17 secured in slots 18 in the hub of a gear cluster 19 by screws 20. The keys 17 project through suitable slots 21 formed in the member 14 and extend into keyways 22 formed in the spindle 13. The member 14 is rotatably supported in the spindle head housing 25 through the medium of anti-friction bearings 26 and 27 and is adapted to be rotated through one of the gears of the gear cluster 19, which gears are adapted to be selectively engaged by the gears of a gear cluster 28 slidably keyed to a shaft 29 rotatably supported in the spindle head and adapted to be driven through suitable mechanism from a reversible main driving motor arranged for ceiling mounting and enclosed within a guard 31 at the left-hand end of the machine. The member 14 is also adapted to be selectively driven at a high rate of speed by a flexible drive connection designated generally by the reference character 32, and including a pulley 33 formed integral with the member 14.

The machine thus far described is similar to that disclosed in our copending application Serial No. 243,616, entitled "Boring machine" and the various operations and movements of the different elements of the machine, including the longitudinal movement of the spindle 13 within the spindle quill G, are controlled from a pendant control station H described and claimed in said application. This mechanism per se forms no part of the present invention and will not be described in detail.

The keyways 22 are preferably milled in the spindle 13 and stop short of the front end of the spindle which is suitably formed for the reception of the tools to be used therewith. Alternate or simultaneous reciprocation and rotation of the spindle heretofore caused chips, etc., to work back along the keyways 22 and between the spindle quill G with the result that they eventually marred the spindle and got into the bushings and gearing. As previously stated, the present invention contemplates the provision of novel means for preventing this from happening. In the embodiment shown, this mechanism comprises two members 35 slidably supported in suitable apertures 36 in an annular or ring-like member 37 bolted to the forward end of the member 14 by socket-headed cap screws 38. The radially inward ends of the members 35 extend into the keyways 22 and conform thereto. The members 35 are continuously urged in a radially inward direction by compression springs 39 interposed therebetween and a member 40 fixed in the outer counterbored part of the aperture 36 within which the members 35 are positioned. The members 35 prevent the entrance of chips along the keyways 22 and in the event that the spindle is retracted to a position where the keyways are wholly within the spindle head, the members 35 merely ride up the inclines 41 at the ends of the keyways and thereafter engage the outside cylindrical surface of the spindle until the spindle is again extended to where they re-engage within the keyways.

While we have shown the members 35 of a specific construction and in combination with the tool spindle of the horizontal boring machine, it is to be understood that the invention is not limited to the particular construction or arrangement of parts shown or to the tool spindle of a horizontal boring machine, but is equally applicable to any spindle or shaft having a keyway therein along which chips and the like may enter the interior of the supporting structure.

The present invention also contemplates means for clamping a cylindrical member in an aperture without causing relative movement therebetween transversely of the axis of the member. The members which it is desired to clamp together are simultaneously engaged at suitably spaced places by means interposed between the members and actuated from a single device or lever. As shown, this clamping mechanism comprises a plurality of segments 45, 46, 47, 48 and 49 located in a groove 50 formed in the spindle quill G by the right-hand end of the member 14, the member 37, and an annular or ring-like wiper member 51 fixed within the member 37 and spaced from the end of the member 14. One end of each of the segments 45, 46, 48 and 49 is provided with an aperture comprising a V-shaped portion 52 and a slot 53 extending towards the other end of the segment.

The construction is such that the ends of the segments which have the apertures therein are suitably spaced circumferentially of the spindle 13 and are adapted to be expanded into engagement with the interior surface of the member 37 and the exterior surface of the spindle 13. For the purpose of expanding the ends of the segments, wedge members in the form of rollers 55 are interposed between adjacent ends of the segments, with the exception of the adjacent ends of segments 45 and 49. The adjacent ends of the latter two segments are inclined as at 56 and are adapted to be forced apart by a roller 57 interposed therebetween and adapted to be moved radially inwardly by a screw 58 threaded into a suitable aperture 60 in the member 37, through the medium of a washer or shoe member 61 interposed between the roller 57 and the inner end of the screw 58 which prevents the screw 58 from moving the roller 57. The member 58 is provided wtih a suitable driving connection adapted to receive a wrench for rotating the same. As the segments 45 and 49 are moved or forced apart by the roller 57, the rollers 55 expand the apertured ends of the segments 45, 46, 48 and 49 into tight clamping engagement with the spindle and spindle quill. In the preferred embodiment of the invention shown, the present clamping means permits the spindle 13 to be clamped within the spindle quill G without causing the spindle to run out.

The wiper member, designated generally by the reference character 51, comprises an annular composition member 63 having a groove in the right-hand side, as viewed in Fig. 3, and an annular spring member 64 molded therein. The member 63 is enclosed within a metal casing formed by an annular member 65, the right-hand face of which is closed by a washer-shaped member 66. The inside diameter of the member 66 is slightly larger than the outside diameter of the spindle 13 and the lower right-hand edge of the member 63 projects therethrough. The spring 64 yieldably urges the lower right-hand corner of the member 63 into continuous contact with the exterior of the spindle 13, thus preventing the entrance of chips, etc., into the spindle head along the spindle at places other than the keyways.

Relative rotation between the member 37 and the member 14 is prevented by pins 68 located in the bottom of apertures 69 and projecting into suitable apertures 70 formed in the end of the member 14. The outer ends of the apertures 69 are tapped and may be employed for bolting a cutter to the member 37 if desired. While in the embodiment of the invention shown the member 37 is a separate element fixed to the right-hand end of the member 14, as viewed in Fig. 2, it is to be understood that the part 37 may be formed as an integral part of the member 14 if desired.

From the foregoing description, it is believed that it will be apparent that the objects of the invention have been accomplished and that new and improved means have been provided for clamping a member within an aperture without producing relative movement between the axis of the aperture and the member. It will also be apparent that new and improved means have been provided for preventing the entrance of chips into a supporting housing along a keyway in a shaft projecting from the housing.

Although the invention has been illustrated and described as embodying a horizontal boring machine, the invention is not limited to machines of this character but is applicable to any situation where a like or similar problem exists. We do not wish to be limited to the particular construction shown and described which may be varied within the scope of the invention and it is our intention to cover hereby all adaptations, modifications and uses thereof which come within the practice of those skilled in the art to which the invention relates and we particularly point out and claim as our invention the following:

1. In a device of the character described, the combination of a member having an aperture therein including an annular groove, a second member in said aperture, segments in said groove, a plurality of said segments having expandible ends, and members located between a plurality said segments for expanding the ends thereof into engagement with said first-mentioned member and said second member for the purpose of clamping said members together.

2. In a device of the character described, the combination of a member having an aperture therein including an annular groove, a second member in said aperture, segments having expandible ends located in said groove, the expandible portions of said segments being equally spaced circumferentially of said second member, and members located between a plurality of said segments for expanding the ends thereof into engagement with said first-mentioned member and said second member for the purpose of clamping said members together.

3. In a device of the character described, the combination of a member having an aperture therein including an annular groove, a second member in said aperture, segments in said annular groove, a plurality of said segments each having an aperture in one end thereof including a slot extending towards the other end of the segment, and members located between said segments for expanding the ends thereof into engagement with said first-mentioned member and said second member to clamp said members together.

4. In a device of the character described, the combination of a member having an aperture therein including an annular groove, a cylindrical member in said aperture, segments in said annular groove, a plurality of said segments each having a V-shaped aperture in one end thereof and a slot extending from the bottom of the V-shaped aperture towards the other end of the segment, and means located between a plurality of said segments for expanding the ends of said segments provided with said apertures into engagement with said first-mentioned member and said cylindrical member to clamp the same together.

5. In a device of the character described, the combination of a member having an aperture therein including an annular groove, a second member in said aperture, segments in said annular groove, a plurality of said segments each having a V-shaped aperture in one end thereof including a slot extending towards the other end of the segments, wedge members located between said segments for expanding the ends thereof into engagement with said first-mentioned member and said second member to clamp said members together, and means for moving said segments circumferentially to effect the aforesaid expansion of the ends.

6. In a device of the character described, the combination of a member having an aperture therein including an annular groove, a second member in said aperture, segments in said annular groove, a plurality of said segments each having a V-shaped aperture in one end thereof and a slot extending from the bottom of the V-shaped aperture towards the other end of the segment, said apertures being spaced circumferentially of said second member, wedge members located between said segments for expanding the ends of said segments provided with said slots into engagement with said first-mentioned member and said second member to clamp the same together, and means for moving said segments circumferentially to effect the aforesaid expansion of the ends.

7. In a horizontal boring mill, the combination of a spindle head, a spindle quill having an internal annular groove, means for rotatably supporting said spindle quill in said spindle head, a tool spindle, means for slidably supporting said tool spindle within said spindle quill, a plurality of segments having expandible ends in said annular groove, and members located between a plurality of said segments for expanding the ends thereof into engagement with said spindle quill and said spindle to clamp the same together.

8. In a horizontal boring mill, the combination of a spindle head, a spindle quill having an internal annular groove, means for rotatably supporting said spindle quill in said spindle head, a tool spindle, means for slidably supporting said tool spindle in said spindle quill, a plurality of segments having expandible ends in said annular groove, members located between said segments for expanding the ends thereof into engagement with said spindle quill and said spindle to clamp the same together.

9. In a horizontal boring machine, the combination of a spindle head, a tubular spindle quill having an internal annular groove therein, means for rotatably supporting said spindle quill in said spindle head, a tool spindle, means for slidably supporting said tool spindle in said spindle quill, segments in said annular groove, a plurality of said segments each having an aperture in one end including a slot extending towards the other end of the segment, members located between a plurality of said segments adapted to expand the ends of said segments having the apertures therein into engagement with said spindle quill and said tool spindle for clamping the same together.

10. In a horizontal boring machine, the combination of a spindle head, a tubular spindle quill having an internal annular groove therein, means for rotatably supporting said spindle quill in said spindle head, a tool spindle, means for slidably supporting said tool spindle in said spindle quill, segments in said annular groove, a plurality of said segments each having a V-shaped aperture in one end thereof including a slot extending towards the other end of the segment, members located between said segments adapted to expand the ends of said segments having the apertures therein into engagement with said spindle quill and said tool spindle for clamping the same together, and means for moving said segments circumferentially to expand said ends thereof having said slots therein, the expandible ends of said segments being equally spaced circumferentially of said spindle.

11. In a device of the character described, the combination of a supporting member, a spindle having a longitudinal keyway therein, means for slidably supporting said spindle in said supporting member, a member for closing the aperture formed by said keyway, means for slidably supporting said last named member in said supporting member for movement radially of the longitudinal axis of said spindle, and means for yieldably urging said member into engagement with said spindle.

12. In a device of the character described, the combination of a supporting member, a spindle having a longitudinal keyway therein, means for slidably supporting said spindle in said supporting member, annular means carried by said member and yieldably urged into continuous contact with the exterior of said spindle, a member for closing the aperture formed by said keyway, means for slidably supporting said last named member in said supporting member for movement redially of the longitudinal axis of said spindle, and means for yieldably urging said member into contact with said spindle.

13. In a horizontal boring machine of the character described the combination of a spindle head, a tubular spindle quill rotatably supported in said spindle head, a spindle slidably supported in said spindle quill and having a longitudinally extending keyway in the exterior surface, wiper means normally projecting into said keyway for closing the aperture formed thereby, means for slidably supporting said wiper means in said spindle quill for movement radially of the longitudinal axis of said spindle, and means for yieldably urging said wiper means into contact with said spindle.

14. In a horizontal boring machine of the character described the combination of a spindle head, a tubular spindle quill rotatably supported in said spindle head, means for rotating said spindle quill, a spindle slidably supported in said spindle quill with the tool or forward end projecting from said spindle quill, said spindle quill having a longitudinally extending keyway in the exterior surface thereof, a key carried by said spindle quill and projecting into said keyway whereby said spindle is caused to rotate with said spindle quill, annular wiper means carried by said spindle quill and yieldably urged into continuous contact with the exterior of said spindle, a second wiper means adjacent to said annular wiper means normally projecting into said keyway for closing the aperture formed thereby, means for slidably supporting said second wiper means in said spindle quill for movement radially of the longitudinal axis of said spindle, and means for yieldably urging said second wiper means into contact with said spindle.

15. In a horizontal boring machine, the combination of a spindle head, a tubular spindle quill assembly having an internal annular groove adjacent to the front end thereof, means for rotatably supporting said spindle quill assembly in said spindle head, a tool spindle slidably supported in said spindle quill assembly with the forward end thereof projecting from said spindle quill assembly, said tool spindle having a longitudinally extending keyway therein, a plurality of segmental members in said annular groove each having V-shaped apertures in one end thereof including a slot extending towards the other end of the segmental member, wedge members located between said segmental members adapted to expand the ends of said segmental members having the apertures therein in engagement with said spindle quill assembly and said tool spindle for clamping the same together, means for moving said segmental members circumferentially to expand the ends thereof having said slots therein, annular wiper means carried by said spindle quill assembly in advance of said segmental members, means for yieldably urging said annular wiper means into continuous contact with the exterior of said spindle, a second wiper means carried by said spindle quill assembly adjacent to said annular wiper means and projecting into said keyway, and means for yieldably urging said second wiper means into continuous contact with said spindle.

HENRY M. LUCAS.
HALLIS N. STEPHAN.